R. H. LECKY.
Traction-Wheel.
No. 42,203.
Patented Apr. 5, 1864.
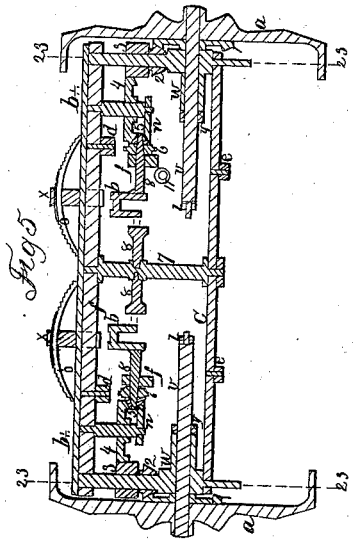
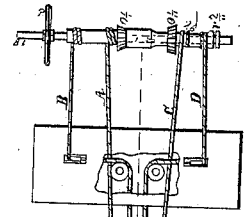
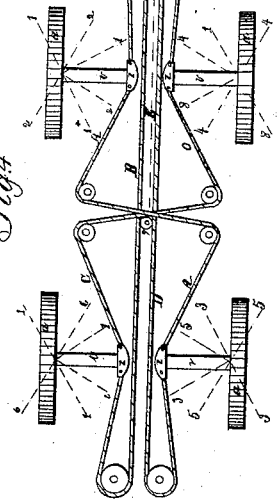
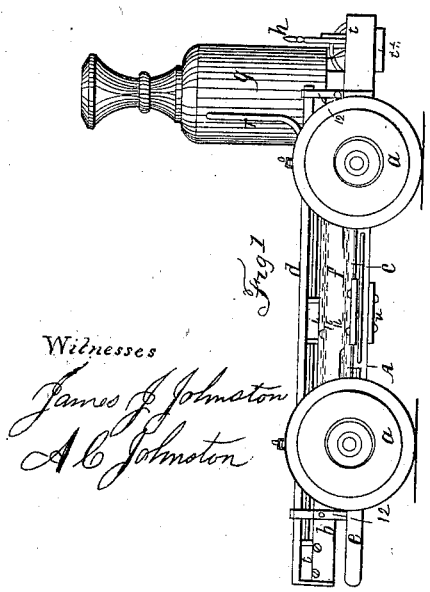
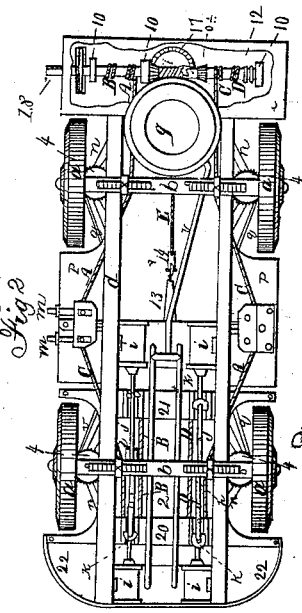

UNITED STATES PATENT OFFICE.

ROBERT H. LECKY OF McCLURE, PENNSYLVANIA.

IMPROVEMENT IN STEAM-WAGONS.

Specification forming part of Letters Patent No. 42,203, dated April 5, 1864.

*To all whom it may concern:*

Be it known that I, ROBERT H. LECKY, of McClure Township, in the county of Allegheny and State of Pennsylvania, have invented certain new and useful Improvements in Steam-Wagons; and I do hereby declare that the following is a full and exact description thereof, reference being had to the accompanying drawings, and to the letters and figures marked thereon.

The nature of my invention consists in arranging the running-gear of stem-wagons so that the driving-gear is relieved from any undue strain caused by the jarring or concussive action of the wagon when running over rough or uneven roads.

My invention further consists in the use of swivel-bearings for the wagon-wheels, the axis of said swivel-bearings being placed central to the periphery of said wheels, so that they may be turned sidewise to any desired angle without any back or forward revolution of said wheels other than that imparted to them by the action of the engines and driving-gear.

My invention also consists in an arrangement for guiding and turning the wagon by means of tiller-ropes attached to the axles of the wagon-wheels and operated by means of a shaft and wheels, the whole being constructed, arranged, and operating in the manner hereinafter described.

To enable others skilled in the art to make and use my invention, I will proceed to describe its construction and operation.

In the accompanying drawings, Figure 1 is a side view of the steam-wagon. Fig. 2 is a top view of the same. Fig. 3 represents a transverse section. Fig. 4 is a plan representing the position, attachments, and operations of the tiller-ropes in their connection with the wagon-wheels.

In the drawings $a$ represents the wagon-wheels.

$b$, $c$, $d$, $e$, and $f$ represent the wagon-frame, which is held together by means of the bottom piece, $p$, cross-pieces 20 and 21, standards 12, braces $q$ and 22, and suitable bolts or screws.

$g$ represents an ordinary upright steam-boiler and its furnace.

$i$ represents the cylinders of the engines.

$k$ are T-heads the slides of which rest on the cross-pieces 20 and 21.

$j$ represents the piston-rods, which are attached to the cranks $l$ of the crank-shafts 8, which have their bearings in the standard 7 and the side-bars $f f$ of the wagon-frame.

$b'$ represents spring-bars which rest on the transverse bars $b$. On the spring-bars $b'$ are placed elliptic springs $o$.

$x$ represents bands, which hold the springs and spring-bars in the desired position.

$r$ represents the steam-pipe.

19 represents the escape-pipe.

I wish it clearly understood that I do not confine myself to any particular form or mode of constructing the wagon-frame. Neither do I confine myself to any particular arrangement of the engines, boiler, steam-pipe, or water-tanks, with the single exception of furnishing the engines on one side of the wagon with a crank-shaft which is not connected with the crank-shaft of the engines on the opposite side, so that each pair of engines may have a different motion when so desired. With this one exception, I leave the arrangement of the engines and their parts and the construction of the wagon-frame to the good judgment, taste, and skill of the mechanic.

$w$ represents the swivel-bearings for the axles $v$ of the wheels $a$. The axis of the bearings $w$ is placed central to the periphery of the wheels $a$, as indicated by the red dotted lines marked 23.

It will be readily observed that the swivel-bearings $w$ and the axles $v$ may be made in one piece, so as to form a swivel-axle for the wheels; but the swivel-bearings, whether made separate from or united with the axles, should have their axis placed central to the periphery of the wheels, as heretofore stated, so that the wheels $a$ in their oscillations sidewise may turn on the bearing-point of their periphery without any back or forward motion other than that imparted to them by the engines and the driving-gear, thus relieving the engines and driving-gear from all undue strain. The axles $v$ of the wheels $a$ are held in the swivel-bearings by means of collars $y$, which are secured to the axles. On the end of the axles $v$ are placed swivel-heads $z$, to which are attached the tiller-ropes A, B, C, and D, (which may consist of wire ropes or chains,) which pass around pulleys arranged as represented in Fig. 4. The tiller-ropes are attached to shaft 18, which is armed with a wheel, $o'$, and furnished with loose drums $n'$ and $y'$, which couple at the point marked 11. (See Figs. 3 and 4.) The drum $y'$ is armed with a wheel, $o^2$, and is furnished with a recess or groove, $t^2$, in which is placed the lower end of the lever $h$, (shown in Fig. 1,) the fulcrum of which is placed in the pieces $x'$, which rest on the floor of the platform for the engineer.

S represents the tiller-wheel, which is attached to the shaft 18, the bearings of which are marked 10. The wheels $o'$ on shaft 18 operate the wheels 17 and $o^2$. The wheel 17 is secured to the bottom of the platform $t$, used for supporting the shaft 18 and its parts.

To the drum $n'$ is attached a rope or chain, which is represented by a dotted line marked E. On the end of this rope is a pulley, 9. This rope and pulley are used for the purpose of bringing the axles $v$ into such position that the inner ends of the axles will point to the center of the wagon-frame.

$m$ represents set-screws, which are attached to two of the side pulleys, and are used for the purpose of taking up the slack in the ropes A C.

13 represents the pulley-block of the pulley 9.

14 represents an ordinary stretching-link, a number of which may be used in connection with the tiller-ropes for the purpose of regulating their length.

$t'$ represents a piece which is attached to the bottom of the platform $t$ for the purpose of supporting the pulleys (of the tiller-ropes) which are placed directly under the shaft 18.

I wish it clearly understood that I do not confine myself to any particular arrangement, position, or manner of attaching the pulleys used in connection with the tiller-ropes, for it will readily be observed by the skillful mechanic that they may be varied to suit any desired change which may be made in constructing the wagon-frame, or for any desired arrangement of the engines and their parts.

On the crank-shafts 8 are drag-wheels 6 for operating the endless chains 16, (see Fig. 1,) which are used for imparting motion to the driving-gear of the front wheels, the construction and arrangement of which is similar to the driving-gear used for the back wheels. (R presented in Fig. 3.)

On the end of crank-shafts 8 are placed bevel-wheels 5, which gear into the "crown-wheels" 4, which gear into the wheels 3 on the axis of the swivel-bearings $w$. To wheels 3 are attached bevel-wheels 2, which gear into wheels 1, placed on the inner face of the wheels $a$. The wheels 3 are made thick to obtain teeth of sufficient length to allow the teeth of the wheels 4 to play up and down in the teeth of wheels 3. By this arrangement of long teeth in wheels 3 the driving-gear is prevented from becoming unshipped by the jostling and springing action of the wagon. The wheels 3 and 2 revolve on the axles of the swivel-bearings $w$.

The operations of my improvement are as follows: Having all things constructed and arranged substantially as herein described, I start the engines, which will impart motion to the crank-shafts 8, which impart motion to the endless chains 16, which impart motion to the driving-gear of the front wheels, the wheels 5, drive-wheels 4, and wheels 4, drive-wheels 3 and 2, which will drive the wheels $a$.

The wagon is guided and turned in the following manner: To guide the wagon I uncouple the drums $y'$ from the drum $n'$, which will unship the wheel $t^2$ from the wheel 17, as represented in Fig. 2. The guiding-gear is then ready for turning the wagon to the right or left. If I desire to turn the wagon to the right, I turn the wheel $s$ so as to draw the axles $v$ and wheels $a$ into the position represented by the dotted lines 1, 2, 3, and 4 in Fig. 4; and when I desire to turn the wagon to the left, I turn wheel $s$ so as to draw the axles $v$ and wheels $a$ into the position represented by the dotted lines 5, 6, 7, and 8 in Fig. 4; and when I desire to turn the wagon entirely around, turning it on its own center—that is to say, so that the wheels $a$ will travel in a true circle—I then turn wheel $s$ so as bring the wheels $a$ into the position represented in Fig. 2. I then couple the drum $y'$ to the drum $n'$, (by means of lever $h$,) which will bring the wheel $o'$ into gear with the wheel 17. I then turn the wheel $s$, which will wind up the rope E on the drum $n'$, which will cause the pulley 9 to draw the ropes A and C forward, which will cause the axles $v$ to point inwardly to a common center, throwing the wheels $a$ into a position similar to that represented by the dotted lines 1, 2, 5, and 8 in Fig. 4.

It will be observed that the entire weight of the wagon-frame and machinery is brought to bear on the outer ends of the spring-bars $b'$, so that the wagon-frame can move up and down on the axis of the swivel-bearings $w$, thereby relieving the driving-gear from all undue strain.

Having thus described the nature, construction, and operation of my improvement, what I claim as of my invention is—

1. The use of the swivel-bearings $w$, or their equivalents, with their axis placed central to the periphery of the wheels, so that said wheels may be turned sidewise without any back or forward motion other than that imparted by the engines and driving-gear, as herein described and set forth.

2. The arrangement of the wheels $a$, 1, 2, 3, 4, 5, and 6, endless chains 16, crank-shafts 8, spring-bars $b'$, and elliptic-springs $o$, arranged and operating substantially as herein described, and for the purpose set forth.

3. The arrangement of the shaft 18, furnished with drums $n'$ $y'$, and wheels $o$, wheel 17, swivel-heads $z$, and tiller-ropes A, B, C, D, and E, when used in connection with the axles $v$, swivel bearings $w$, and wheels $a$, arranged and operating substantially as herein described, and for the purpose set forth.

ROBERT H. LECKY.

Witnesses:
 JAMES J. JOHNSTON,
 ALEXANDER HAYS.